(12) United States Patent
Thommana et al.

(10) Patent No.: US 11,050,443 B1
(45) Date of Patent: Jun. 29, 2021

(54) BEYOND LINE OF SIGHT WAVEFORM AND LINE OF SIGHT WAVEFORM SOFTWARE-DEFINED RADIO

(71) Applicant: Rockwell Collins, Inc., Cedar Rapids, IA (US)

(72) Inventors: John V. Thommana, Cedar Rapids, IA (US); Jeffrey Grundmeyer, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/024,892

(22) Filed: Sep. 18, 2020

(51) Int. Cl.
*H04L 5/12* (2006.01)
*H04L 23/02* (2006.01)
*H04B 1/00* (2006.01)
*H04B 1/10* (2006.01)
*H04B 7/185* (2006.01)

(52) U.S. Cl.
CPC ............. *H04B 1/0003* (2013.01); *H04B 1/10* (2013.01); *H04B 7/185* (2013.01)

(58) Field of Classification Search
CPC ......... H04B 1/0003; H04B 7/185; H04B 1/10
USPC ....................................................... 375/262
See application file for complete search history.

(56) References Cited

U.S. PATENT DOCUMENTS

| | | | |
|---|---|---|---|
| 4,914,699 A | 4/1990 | Dunn et al. | |
| 6,020,845 A * | 2/2000 | Weinberg | H04B 7/18513 |
| | | | 342/354 |
| 7,804,887 B2 * | 9/2010 | Page | H04L 27/10 |
| | | | 375/219 |
| 7,903,749 B2 | 3/2011 | Moffatt | |
| 7,962,089 B1 | 6/2011 | Thommana et al. | |
| 8,055,209 B1 | 11/2011 | Dao | |
| 8,374,272 B2 | 2/2013 | Hammons et al. | |
| 9,094,842 B2 | 7/2015 | Geile | |
| 9,966,981 B2 * | 5/2018 | Leipold | H03H 7/38 |

(Continued)

FOREIGN PATENT DOCUMENTS

EP 0363640 B1 1/1997

OTHER PUBLICATIONS https://www.cobra-design-eng.com/products/, "Diplexer/Triplexer", Cobra Design & Engineering Inc., Printed Jul. 15, 2020.

(Continued)

*Primary Examiner* — Tanmay K Shah
(74) *Attorney, Agent, or Firm* — Suiter Swantz pc llo

(57) ABSTRACT

A system may include a node. The node may include a first software-defined radio (SDR) configured to support transmit and receive communications using a beyond line of sight (BLOS) waveform. The node may include a second SDR to support transmit and receive communications using a line of sight waveform while simultaneously being configured to support receive communications using a narrowband (NB) ultra high frequency (UHF) satellite communication (SATCOM) waveform. The node may include a SATCOM antenna configured to transmit and receive the communications using the BLOS waveform and to receive the communications using the NB UHF SATCOM waveform. The node may include a low noise amplifier (LNA) and triplexer assembly. The first and second SDRs may share the SATCOM antenna and the LNA and triplexer assembly.

15 Claims, 7 Drawing Sheets

(56) References Cited

U.S. PATENT DOCUMENTS

| | | | |
|---|---|---|---|
| 10,587,291 B2 | 3/2020 | Pehlke et al. | |
| 2008/0031388 A1* | 2/2008 | Rabbath | H04B 1/28 |
| | | | 375/346 |
| 2012/0081259 A1 | 4/2012 | Regala | |
| 2018/0217267 A1* | 8/2018 | Lim | H04B 7/18504 |
| 2018/0367170 A1* | 12/2018 | McIntyre | H04B 1/0057 |
| 2019/0058495 A1 | 2/2019 | Myers | |
| 2019/0123769 A1* | 4/2019 | Pehlke | H04B 1/0057 |
| 2021/0011108 A1* | 1/2021 | Hong | G01S 3/043 |

OTHER PUBLICATIONS https://www.collinsaerospace.com/what-we-do/military-and-defense/communications/airborne-communications/vhf-uhf-l-band/arc-210-rt-2036-c, "ARC-210 RT-2036 (C) Networked Communications Airborne Radio", Collins Aerospace, Printed Jul. 15, 2020.

* cited by examiner

BEYOND LINE OF SIGHT WAVEFORM AND LINE OF SIGHT WAVEFORM SOFTWARE-DEFINED RADIO

BACKGROUND

Currently, single channel radios support both line of sight (LOS) and beyond line of sight (BLOS) waveforms but cannot communicate with both waveforms simultaneously.

SUMMARY

In a further aspect, embodiments of the inventive concepts disclosed herein are directed to a system. The system may include a node. The node may include a first software-defined radio (SDR) configured to support transmit and receive communications using a beyond line of sight (BLOS) waveform. The node may include a second SDR to support transmit and receive communications using a line of sight waveform while simultaneously being configured to support receive communications using a narrowband (NB) ultra high frequency (UHF) satellite communication (SATCOM) waveform. The node may include a SATCOM antenna configured to transmit and receive the communications using the BLOS waveform and to receive the communications using the NB UHF SATCOM waveform. The node may include a low noise amplifier (LNA) and triplexer assembly. The first and second SDRs may share the SATCOM antenna and the LNA and triplexer assembly.

In a further aspect, embodiments of the inventive concepts disclosed herein are directed to a method. The method may include: supporting, by a first software-defined radio (SDR) of a node, transmit and receive communications using a beyond line of sight (BLOS) waveform; and supporting, by a second SDR of the node, transmit and receive communications using a line of sight waveform while simultaneously supporting receive communications using a narrowband (NB) ultra high frequency (UHF) satellite communication (SATCOM) waveform, wherein the node includes a SATCOM antenna configured to transmit and receive the communications using the BLOS waveform and to receive the communications using the NB UHF SATCOM waveform, wherein the node includes a low noise amplifier (LNA) and triplexer assembly, wherein the first SDR and the second SDR share the SATCOM antenna and the LNA and triplexer assembly.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
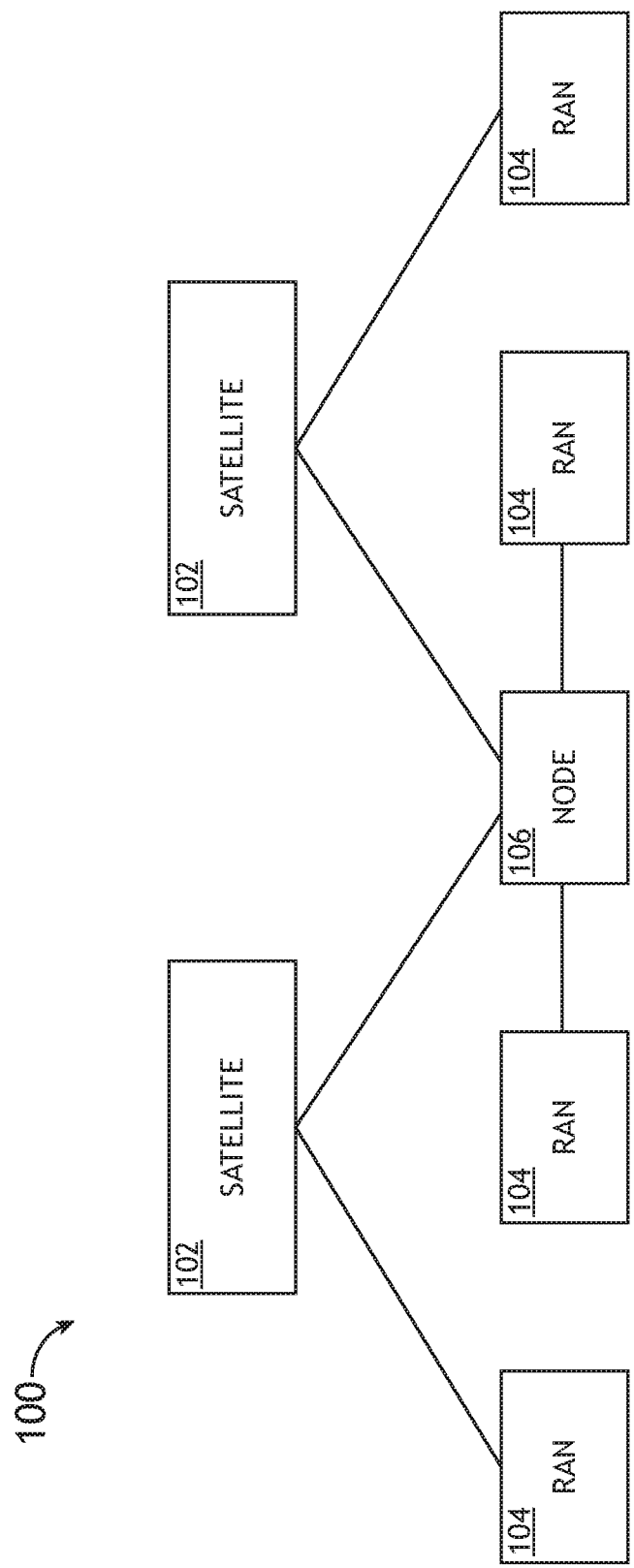
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to a method and a system including at least one software-defined radio (SDR) configured to communicate over at least one channel by using at least one BLOS waveform and/or at least one LOS waveform. For example, the two SDRs may be configured to communicate with two BLOS waveforms (e.g., a Mobile User Objective System (MUOS) waveform and a narrowband (NB) Ultra High Frequency (UHF) satellite communication (SATCOM) waveform). The MUOS waveform may use 5 megahertz (MHz) bandwidth, and the NB UHF SATCOM waveform may use 5 kilohertz (kHz) or 25 kHz bandwidth. For example, two SDRs may be collectively configured to communicate by using two BLOS waveforms and at least one LOS waveform.

Figure 2:
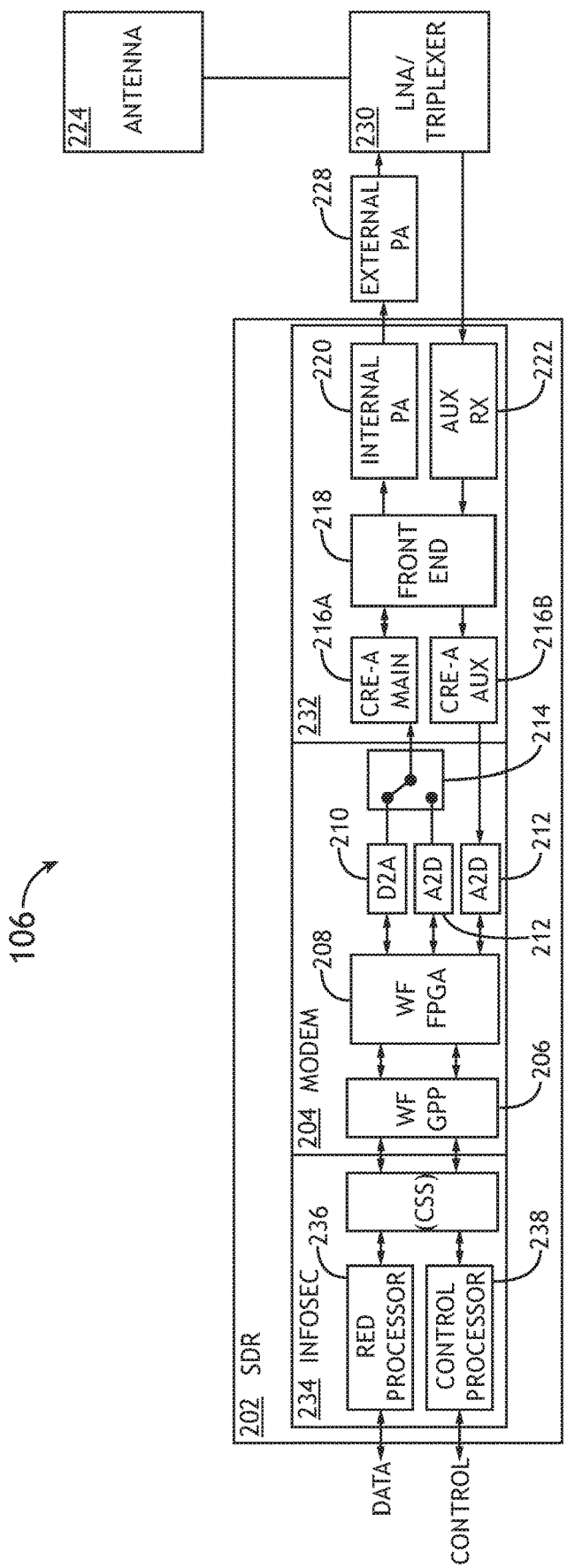
FIG. 2 is a view of an exemplary node of the system of FIG. 1 of an exemplary embodiment according to the inventive concepts disclosed herein.
Figure 3:
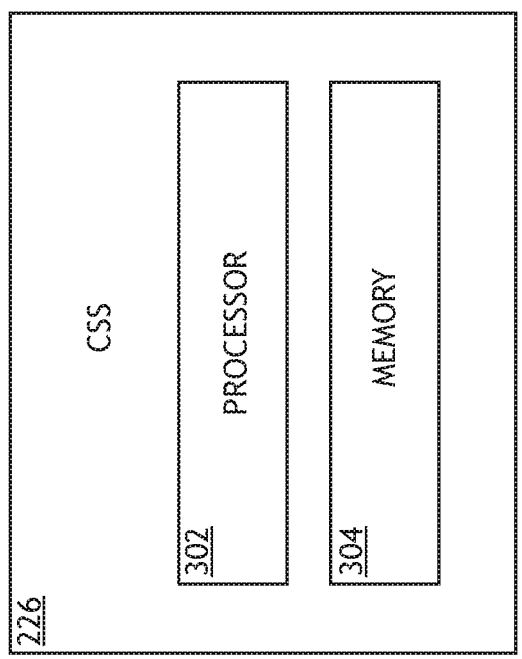
FIG. 3 is a view of an exemplary cryptographic subsystem (CSS) of the node of FIG. 2 of an exemplary embodiment according to the inventive concepts disclosed herein.

Referring now to FIGS. 1-3, an exemplary embodiment of a system 100 according to the inventive concepts disclosed herein is depicted. The system 100 may be implemented as any suitable system, such as a network. The system 100 may include at least one satellite 102, at least one radio access node (RAN) 104 (sometimes referred to as a base station or a ground station), and/or at least one node 106, some or all of which may be communicatively coupled at any given time. For example, the satellite's 102 antennas may form a plurality of beams configured to transmit signals to the RANs 104 and the nodes 106. For example, each of the RANs 104 and the nodes 106 may transmit communications to and receive communications from the satellites 102. For example, each of the nodes 106 may be configured to communicate directly with some of the RANs 104 and/or ground stations.

In an exemplary embodiment, some or all of the satellites 102 may be configured to support a MUOS waveform only, a UHF SATCOM waveform only, or a combination of UHF SATCOM and MUOS waveforms. Some of the ground stations (e.g., 104) may be configured to only support a MUOS waveform while other of the ground stations may be configured to only support a UHF SATCOM waveform. For example, a MUOS satellite may be configured to communicate with a BLOS SDR of the node 106 and at least one RAN 104, and a UHF SATCOM satellite may be configured to communicate with another SDR of the node 106 and a different ground station (e.g., configured to support a UHF SATCOM waveform).

As shown in FIG. 2, for example, the node 106 may be any suitable network node, such as a terminal (e.g., a vehicle (e.g., an aircraft, a watercraft, a submersible craft, an automobile, a spacecraft, a satellite, and/or a train) or a manpack). For example, as shown in FIG. 2, the node 106 may include at least one SDR 202, at least one external power amplifier 228, at least one low noise amplifier (LNA) and triplexer assembly 230 (e.g., including an LNA and a triplexer), and/or at least one antenna 224, some or all of which may be communicatively coupled at any given time.

As shown in FIG. 2, the SDR 202 may include at least one modem 204, at least one transceiver and receiver assembly 232, and/or at least one information security (INFOSEC) system 234, some or all of which may be communicatively coupled at any given time. In some embodiments, the SDR 202 may be an ARC-210 SDR.

In some embodiments, the SDR 202 may be configured to communicate over at least one channel (e.g., one or multiple channels) by using two BLOS waveforms (e.g., an MUOS waveform and a NB UHF SATCOM waveform). The SDR 202 may be configured to transmit encrypted communications over some or all of the multiple channels to a satellite 102 and on to a RAN 104. The SDR 202 may be configured to receive encrypted communications over some or all of the multiple channels from the RAN 104 via the satellite 102. The SDR 202 may be configured to simultaneously transmit and receive encrypted communications over the multiple channels.

The modem 204 may include at least one processor (e.g., at least one general purpose processor (e.g., at least one waveform general purpose processor 206) and/or at least one field-programmable gate array (FPGA) (e.g., at least one waveform FPGA 208)), memory, at least one digital-to-analog converter (D2A) 210, at least one (e.g., two) analog-to-digital converter (A2D) 212, and/or at least one switch 214, some or all of which may be communicatively coupled at any given time.

The at least one processor of the modem 204 may be implemented as any suitable type and number of processors. For example, the at least one processor may include at least one general purpose processor (e.g., at least one central processing unit (CPU)), at least one digital signal processor (DSP), at least one application specific integrated circuit (ASIC), and/or at least one field-programmable gate array (FPGA). The at least one processor may be configured to perform (e.g., collectively perform if more than one processor) any or all of the operations disclosed throughout. The at least one processor may be configured to run various software applications or computer code stored (e.g., maintained) in a non-transitory computer-readable medium (e.g., memory) and configured to execute various instructions or operations. For example, the at least one processor may be configured to process, in parallel, the received encrypted communications and to-be-transmitted encrypted communications that become the transmitted encrypted communications.

The transceiver and receiver assembly 232 may include at least one (e.g., two) common receiver-exciter (CRE) 216A, 216B, at least one front end 218, at least one power amplifier (e.g., at least one internal power amplifier 220), and/or at least one receiver (e.g., at least one auxiliary receiver 222), some or all of which may be communicatively coupled. CREs are sometimes referred to as transmitters, receivers, and/or transceivers.

The INFOSEC system 234 may include at least one processor (e.g., at least one red processor 236 and/or at least one control processor 238) and/or at least one cryptographic subsystem (CSS) 226, some or all of which may be communicatively coupled. For example, the red processor 236 may interface with a host platform of the node 106 for exchanging data traffic. For example, the control processor 238 may be used to configure the SDR 202 radio configuration and mode setting.

The CSS 226 may be used for transmission security (TRANSEC), communications security (COMSEC), and/or authentication. The CSS 226 may be configured to use particular spreading factors for the transmitted encrypted communications. As shown in FIG. 3, the CSS 226 may include at least one processor 302 and memory 304, some or all of which may be communicatively coupled at any given time. The at least one processor 302 may be implemented as any suitable type and number of processors. For example, the at least one processor 302 may include at least one general purpose processor (e.g., at least one central processing unit (CPU)), at least one digital signal processor (DSP), at least one application specific integrated circuit (ASIC), and/or at least one field-programmable gate array (FPGA).

The at least one processor 302 may be configured to perform (e.g., collectively perform if more than one processor) any or all of the operations disclosed throughout. The at least one processor may 302 be configured to run various software applications (e.g., cryptographic equipment application(s) (CEA(s))) or computer code stored (e.g., maintained) in a non-transitory computer-readable medium (e.g., memory 304) and configured to execute various instructions or operations. All information exchanged over the system may be encrypted. For example, the modem 204 may be connected to the CSS 226 that encrypts and decrypts the traffic stream. The waveform general purpose processor 206 may pick up the encrypted traffic from the CSS 226 and forwards the encrypted traffic over an appropriate radiofrequency (RF) channel and similarly on the receive side, the processor 206 may get the despread encrypted traffic from the FPGA 208 and forward the traffic to the CSS 226 for decryption.

The at least one antenna 224 may be configured to transmit and/or receive communications.

In some embodiments, the MUOS waveform may be a slotted code-division multiple access (CDMA) direct sequence spread spectrum waveform, which may have a 10-millisecond frame and each frame may have 15 slots. The MUOS waveform may be a military waveform. For example, two 40 MHz portions of spectrum may be allocated, with one portion for transmit and the other for receive, and the two portions may be separated by a 20 MHz guard band.

In some embodiments, the NB UHF SATCOM waveform may use 5 kilohertz (kHz) or 25 kHz bandwidth.

Figure 4:
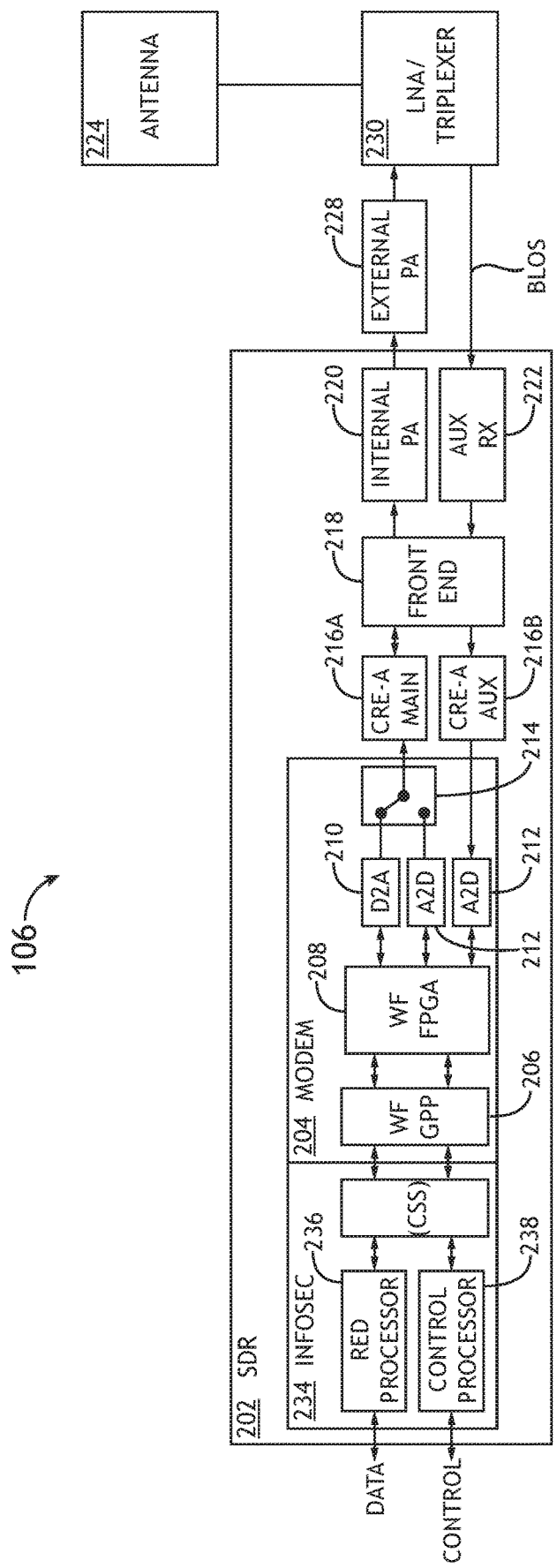
FIG. 4 is a view of an exemplary node of the system of FIG. 1 of an exemplary embodiment according to the inventive concepts disclosed herein.
Figure 5:
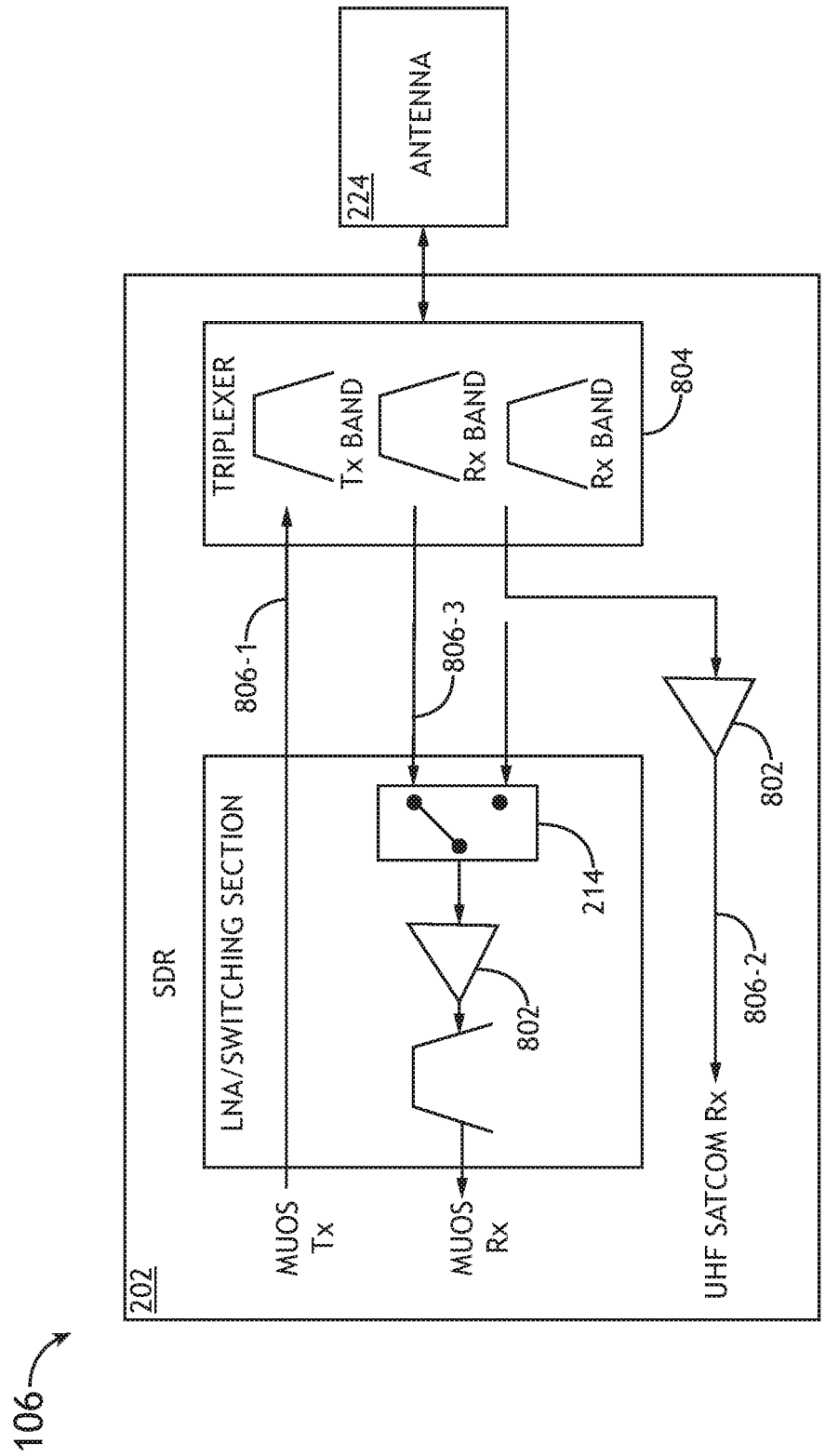
FIG. 5 is a partial view of the node of FIG. 4 of an exemplary embodiment according to the inventive concepts disclosed herein.
Figure 6:
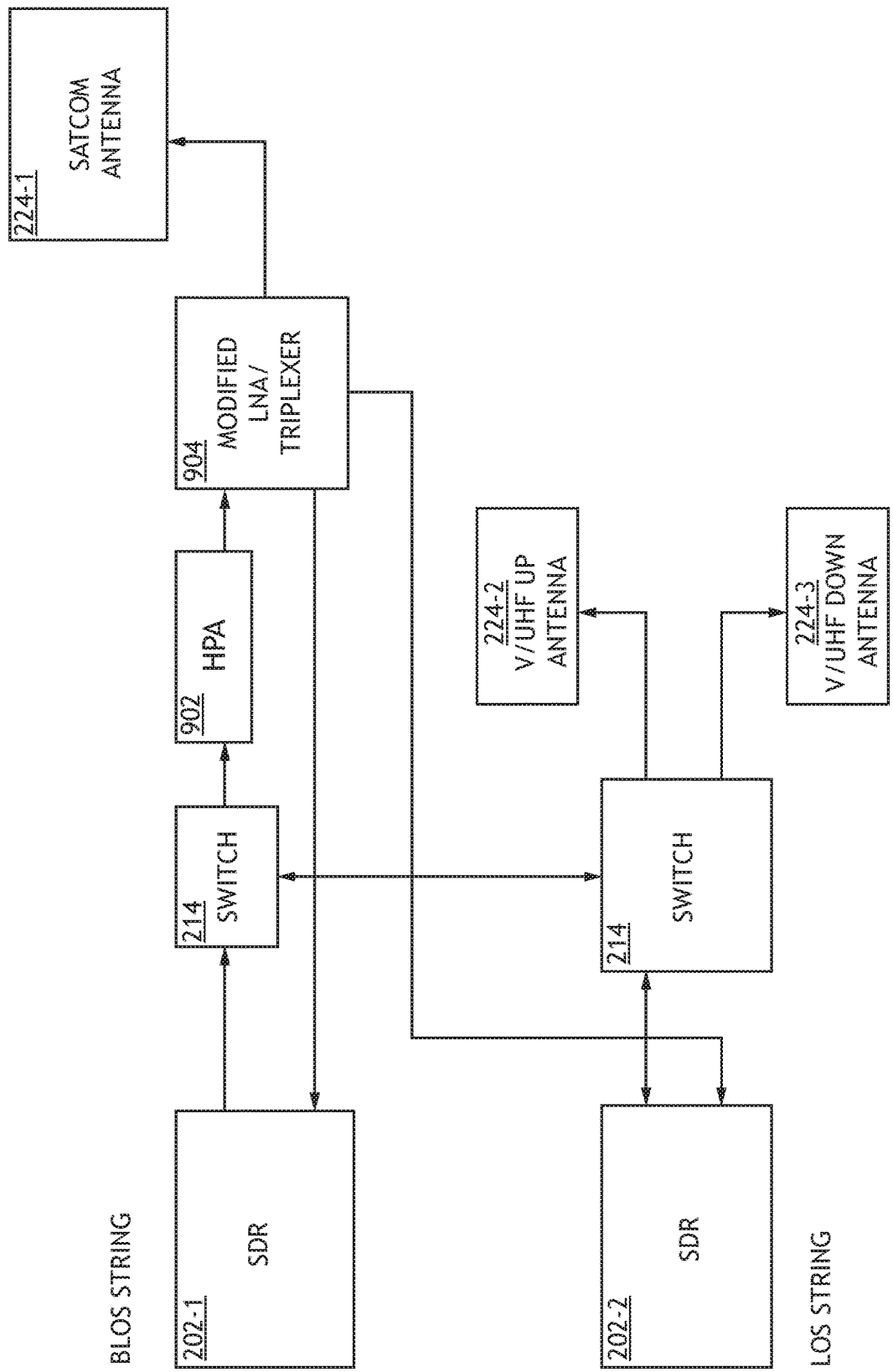
FIG. 6 is a view of an exemplary node of the system of FIG. 1 of an exemplary embodiment according to the inventive concepts disclosed herein.

Referring now to FIGS. 4-6, an exemplary embodiment of the node 106 of the system 100 of FIG. 1 according to the inventive concepts disclosed herein is depicted. The node 106 may include elements and functionality similar to the node 106 shown in FIG. 2, except that, for example, the node 106 may include two SDRs 202 (e.g., a first SDR 202-1 and a second SDR 202-2 as shown in FIG. 6) collectively configured to support three waveforms (e.g., two BLOS waveforms (e.g., an MUOS waveform and a NB UHF SATCOM waveform) and a LOS waveform).

For example, the node 106 may include a first SDR 202 (e.g., as shown in FIG. 2) configured to support transmit and receive communications using a Mobile User Objective System (MUOS) waveform. The node 106 may include a second SDR 202 (e.g., as shown in FIG. 4) to support transmit and receive communications using a line of sight waveform while simultaneously being configured to support receive communications using a narrowband (NB) ultra high frequency (UHF) satellite communication (SATCOM) waveform. The node 106 may include a SATCOM antenna 224 configured to transmit and receive the communications using the MUOS waveform and to receive the communications using the NB UHF SATCOM waveform. The node 106 may include a low noise amplifier (LNA) and triplexer assembly (e.g., 230 or 904). The first and second SDRs 202 may share the SATCOM antenna 224 and the LNA and triplexer assembly (e.g., 230 or 904). Each of the first and second SDRs 202 may include some or all of the elements of the SDR 202 shown in FIGS. 2 and/or 4.

The LOS waveform may be a half-duplex waveform and may use a narrowband 25 kHz bandwidth or wideband bandwidth of 1.2 megahertz (MHz), 5 MHz, 10 MHz, or 32 MHz. For example, the LOS waveform may be Single Channel Ground and Airborne Radio System (SINCGARS), HaveQuick (HQ), Second Generation Anti-jam Tactical UHF Radio for NATO (SATURN), or Soldier Radio Waveform (SRW).

The MUOS waveform may be a slotted code-division multiple access (CDMA) direct sequence spread spectrum waveform, and the MUOS waveform may be a military waveform.

For example, the second SDR 202 may include the auxiliary receiver 222. In some embodiments, the second SDR 202 may support a single receive-only 5 or 25 kilohertz (kHz) NB UHF SATCOM channel using the auxiliary receiver 222. In some embodiments, the second SDR 202 may support multiple receive-only 5 or 25 kilohertz (kHz) NB UHF SATCOM channels using the auxiliary receiver 222. For example, the second SDR 202 may support the multiple receive-only 5 or 25 kilohertz (kHz) NB UHF SATCOM channels using the auxiliary receiver 222 by using at least one 1.2 megahertz (MHz), 5 MHz, 10 MHz, or 32 MHz intermediate frequency (IF) wideband filter.

In some embodiments, the second SDR 202 may can receive 25 kHz, 1.2 MHz, 5 MHz, 10 MHz, and/or 32 MHz LOS waveforms on a main channel while receiving one 5 or 25 kHz UHF SATCOM channel using a 25 kHz aux channel. Multiple 5 and/or 25 kHz UHF SATCOM channels can be received simultaneously using the 1, 5, 10, and/or 32 MHz intermediate frequency (IF) filters available in the second SDR 202. The first SDR 202 may be configured to transmit and receive using the MUOS waveform.

In current radios, the UHF SATCOM waveform is fixed frequency that does not hop hence such that the waveform can be easily deniable. In some embodiments, for the second SDR 202, by allocating multiple 5 and/or 25 kHz channels a user can transmit/receive randomly on any of the channels allocated thereby simulating frequency hopping. In some embodiments, the second SDR 202 in FIG. 4 may be able to transform CRE 216B from using the legacy NB UHF SATCOM waveform into a more robust anti-jam BLOS waveform. By using wider channels (e.g., 5 MHz, 10 MHz, and/or 32 MHz), CRE 216B may have a receive band that can be digitized with multiple channels decoded simultaneously. The entire legacy NB UHF SATCOM receive band is only 30 MHz; in some embodiments, if a 32 MHz intermediate frequency (IF) filter is used, the entire band can be digitized and any set of channels may be processed simultaneously to the level supported by processing resources.

For example, assuming that in a region of interest, two BLOS satellites 102 are visible, and each of two satellites 102 has 32 channels. Typically, one channel is assigned to the second SDR 202 on a dedicated or time shared (e.g., time-division multiple access (TDMA)) basis, which could permit an enemy to jam just one channel to deny BLOS SATCOM access. In an exemplary embodiment, the second SDR 202 may be allocated two BLOS channels, that vary with time on a pseudo-random basis on each satellite 102, such that at any time instant the second SDR 202 can be on any of the 4 channels within the visible 64 channels giving SDR 202 a simplistic anti-jam factor of 16 (12 dB). This anti-jam factor may assume that the entire message is sent on one frequency. If, however, the message is coded across 4 frequencies such that the second SDR 202 can recover the message even if the enemy jams two of the frequencies then the waveform becomes a higher anti-jam waveform as the enemy has to hit three or more channels out of the four, at the right time instant, picked pseudo-randomly out of possible 64 to send our message (which may be a hypergeometric distribution problem). The end result is that this approach may force the enemy to jam all the UHF SATCOM frequencies to deny access to the UHF SATCOM. To totally deny tactical BLOS communication to the node 106, they have to deny both the BLOS waveforms (e.g., the MUOS waveform and the NB UHF SATCOM waveform).

For example, for the second SDR 202, the modem 204 may include at least one processor configured to process the BLOS waveform and the LOS waveform in parallel. For example, the at least one processor may include at least one waveform general purpose processor 206 and at least one waveform field-programmable gate array (FPGA) 208, wherein the waveform general purpose processor 206 may be configured to process the BLOS waveform and the LOS waveform in parallel, wherein the FPGA 208 may be configured to process the BLOS waveform and the LOS waveform in parallel.

The second SDR 202 may include or may be communicatively coupled to a cryptographic subsystem (CSS) 226 communicatively coupled to one or more of the at least one processor (e.g., the processor 206 and/or the FPGA 208). The CSS 226 may be configured to run at least one cryptographic equipment application (CEA) used for both of the BLOS waveform and the LOS waveform. The CSS 226 may be configured to maintain keys for encryption of the BLOS encrypted communications and the LOS encrypted communications. The CSS 226 in the SDR 202 can support multiple CEAs simultaneously to support LOS and BLOS waveforms operating at the same security level. Modern encryption modes can be used for both the LOS waveforms as well as the BLOS waveform, which can leverage key-agility of the CSS 226 such that the two waveforms may use the same set of CEAs at the same security level with only the user data encryption keys used being different. The CSS 226 can support multiple keys simultaneously when using the same CEA.

As shown in FIGS. 5-6, the first and second SDRs 202 may share the antenna 224 (e.g., a SATCOM antenna) and an LNA and triplexer assembly (e.g., 904), which may include a triplexer 804. The triplexer 804 may be configured to support a MUOS waveform receive path 806-3 from the antenna 224, a NB UHF SATCOM waveform receive path 806-2 from the antenna 224, and a MUOS waveform transmit path 806-1 to the antenna 224. For example, each of the NB UHF SATCOM waveform receive path 806-2 and the MUOS waveform receive path 806-3 may include a low noise amplifier (LNA) 802. For example, each of the NB UHF SATCOM waveform receive path 806-2 and the MUOS waveform receive path 806-3 may include an analog-to-digital converter 212, and the MUOS waveform transmit path 806-1 may include a digital-to-analog converter 210.

In some embodiments, the MUOS waveform may be a slotted code-division multiple access (CDMA) direct sequence spread spectrum waveform. The MUOS waveform may be a military waveform. For example, the other BLOS waveform may be NB UHF SATCOM waveform. For example, the LOS waveform may be at least one of SINCGARS, HQ, SATURN, or amplitude modulation (AM)/frequency modulation (FM). Processing resources of the platform may dictate the waveforms used. For example, the NB UHF SATCOM waveform may be a 25 kilohertz (kHz) waveform, and the MUOS waveform may be a 5 megahertz (MHz) waveform. In some embodiments, the second SDR 202 may be configured to receive the NB UHF SATCOM encrypted communications over multiple channels. In some embodiments, the NB UHF SATCOM waveform may require substantially more processing power than the narrowband LOS waveforms. The second SDR 202 may be configured to simultaneously process the LOS waveform and the NB UHF SATCOM waveform, whereas current radios are only capable of processing one of the LOS waveform or the NB UHF SATCOM waveform, which would currently require multiple radios to utilize both the LOS waveform and the NB UHF SATCOM waveform.

In some embodiments, the second SDR 202 may have the ability to receive both NB UHF SATCOM waveform communications and LOS waveform communications without increasing the number of radios on the platform. The LOS waveforms may be half-duplex waveforms and, for example, may use only the main channel of the CRE 216A such that the aux receive channel of the CRE 216B may be unused for LOS waveform communications. Since LOS waveforms are low processing requirement waveforms, the second SDR 202 may be capable of supporting the LOS waveforms, as well as the NB UHF SATCOM waveform if the antenna 224 is connected to the aux receive channel of the CRE 216B. To achieve the antenna 224 being connected to the aux receive channel of the CRE 216B of the second SDR 202, some embodiments may include the triplexer 804 and the LNA 802 on each of the NB UHF SATCOM waveform receive path 806-2 and the MUOS waveform receive path 806-3.

In some embodiments, the waveform FPGA 208 of the second SDR 202 may be partitioned to process the LOS and BLOS (e.g., NB UHF SATCOM) waveforms in parallel. For example, for an LOS mode, the second SDR 202 may operate normally, where the FPGA 208 may use the D2A 210 to transmit the 25 kHz LOS waveform and may uses the A2D 212 attached to the main channel of the CRE 216A for receiving the LOS waveform. In some embodiments, the second SDR 202 may be configured to use the aux channel of the CRE 216B for reception of BLOS waveform communications. When transmitting LOS communications and receiving BLOS communications, the D2A 210 and aux A2D 212 (e.g., coupled to the CRE 216B) may be in use, and when receiving both waveforms, both A2Ds 212 may be processed simultaneously. In some embodiments, the second SDR 202 may be configured to only receive the BLOS communications and not transmit BLOS communications. In some embodiments, if the second SDR 202 is only processing a single 25 kHz channel, both the main channel of the CRE 216A and aux channels of the CRE 216B can be configured with 25 kHz filters. In some embodiments, if the second SDR 202 is configured to process multiple 25 kHz UHF SATCOM channels, the second SDR 202 can use one of the 1.2 MHz, 5 MHz, 10 MHz, and 32 MHz intermediate frequencies (IF) depending on the separation of the channels to be processed. In some embodiments, the second SDR 202 may have the capability to process all 30 MHz of the UHF SATCOM if needed.

In some embodiments, the waveform GPP 206 of the second SDR 202 may be a multi-core system on a chip (SoC) processor that may be capable of processing both BLOS and LOS waveforms simultaneously and communicating with the CRE assembly 216 at one end and the CSS 226 at the other end.

Referring now to FIG. 6, an exemplary embodiment of the node 106 of the system 100 of FIG. 1 according to the inventive concepts disclosed herein is depicted. The node 102 may be configured to support transmitting and receiving MUOS communications, to support transmitting and receiving LOS waveform communications, and to support receiving NB UHF SATCOM waveform communications. The node 106 may include a first SDR 201-1, a second SDR 202-2, switches 214, a high power amplifier (HPA) 902, a modified LNA and triplexer assembly 904, a SATCOM antenna 224-1, a very high frequency (VHF) and/or UHF up antenna 224-2 for LOS waveform communications, and/or a VHF and/or UHF down antenna 224-3 for LOS waveform communications, some or all of which may be communicatively coupled. The SDR 202-1 may be configured to transmit and receive MUOS waveform communications. The SDR 202-2 may be configured to transmit and receive LOS waveform communications and to receive NB UHF SATCOM waveform communications.

Figure 7:
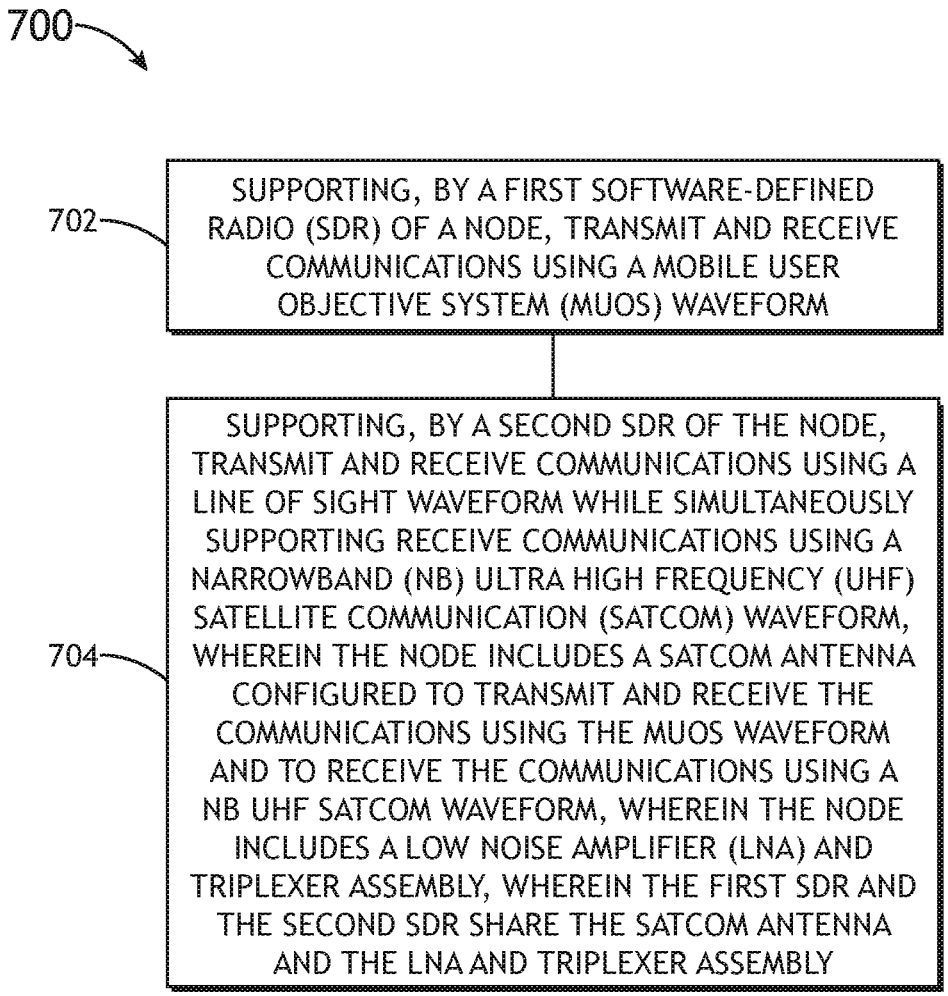
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include supporting, by a first software-defined radio (SDR) of a node, transmit and receive communications using a BLOS waveform (e.g., a Mobile User Objective System (MUOS) waveform).

A step 704 may include supporting, by a second SDR of the node, transmit and receive communications using a line of sight waveform while simultaneously supporting receive communications using a narrowband (NB) ultra high frequency (UHF) satellite communication (SATCOM) waveform. The node may include a SATCOM antenna configured to transmit and receive the communications using the BLOS waveform (e.g., the MUOS waveform) and to receive the communications using the NB UHF SATCOM waveform, wherein the node includes a low noise amplifier (LNA) and triplexer assembly, wherein the first SDR and the second SDR share the SATCOM antenna and the LNA and triplexer assembly.

Further, the method 700 may include any of the operations disclosed throughout.

As will be appreciated from the above, embodiments of the inventive concepts disclosed herein may be directed to a method and a system including at least one software-defined radio (SDR) configured to communicate over at least one channel by using at least one BLOS waveform and/or at least one LOS waveform.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
 a node, comprising:
  a first software-defined radio (SDR), wherein the first SDR is configured to support transmit and receive communications using a beyond line of sight (BLOS) waveform;
  a second SDR, wherein the second SDR is configured to support transmit and receive communications using a line of sight waveform while simultaneously being configured to support receive communications using a narrowband (NB) ultra high frequency (UHF) satellite communication (SATCOM) waveform;
  a SATCOM antenna configured to transmit and receive the communications using the BLOS waveform and to receive the communications using the NB UHF SATCOM waveform; and
  a low noise amplifier (LNA) and triplexer assembly;
  wherein the first SDR and the second SDR share the SATCOM antenna and the LNA and triplexer assembly.

2. The system of claim 1, the LOS waveform is a half-duplex waveform.

3. The system of claim 2, wherein the LOS waveform uses a narrowband 25 kHz bandwidth or wideband bandwidth of 1.2 megahertz (MHz), 5 MHz, 10 MHz, or 32 MHz.

4. The system of claim 1, wherein the second SDR includes an auxiliary receiver, wherein the second SDR supports a single receive-only 5 or 25 kilohertz (kHz) NB UHF SATCOM channel using the auxiliary receiver.

5. The system of claim 1, wherein the second SDR includes an auxiliary receiver, wherein the second SDR supports multiple receive-only 5 or 25 kilohertz (kHz) NB UHF SATCOM channels using the auxiliary receiver.

6. The system of claim 5, wherein the second SDR supports the multiple receive-only 5 or 25 kilohertz (kHz) NB UHF SATCOM channels using the auxiliary receiver by using at least one 1.2 megahertz (MHz), 5 MHz, 10 MHz, or 32 MHz intermediate frequency (IF) wideband filter.

7. The system of claim 1, wherein each of the first and second SDRs comprises a modem, a first common receiver-exciter (CRE), a second CRE, a front end, an internal power amplifier, and an auxiliary receiver, wherein some or all of the modem, the first CRE, the second CRE, the front end, the internal power amplifier, and the auxiliary receiver are communicatively coupled.

8. The system of claim 7, wherein the modem comprises at least one processor.

9. The system of claim 8, wherein the at least one processor includes a waveform general purpose processor and a waveform field-programmable gate array (FPGA).

10. The system of claim 8, wherein each of the first and second SDRs further comprises a cryptographic subsystem (CSS) communicatively coupled to one or more of the at least one processor, the CSS configured to run at least one cryptographic equipment application (CEA).

11. The system of claim 1, wherein the BLOS waveform is a Mobile User Objective System (MUOS) waveform, wherein the MUOS waveform is a slotted code-division multiple access (CDMA) direct sequence spread spectrum waveform, wherein the MUOS waveform is a military waveform.

12. The system of claim 1, wherein the LOS waveform is Single Channel Ground and Airborne Radio System (SINCGARS), HaveQuick (HQ), Second Generation Anti-jam Tactical UHF Radio for NATO (SATURN), or Soldier Radio Waveform (SRW).

13. The system of claim 1, wherein the node is a vehicle.

14. The system of claim 1, further comprising a very high frequency (VHF) or UHF up antenna and a VHF or UHF down antenna, the second SDR communicatively coupled to the VHF or UHF up antenna and the VHF or UHF down antenna.

15. A method, comprising:
supporting, by a first software-defined radio (SDR) of a node, transmit and receive communications using a beyond line of sight (BLOS) waveform; and
supporting, by a second SDR of the node, transmit and receive communications using a line of sight waveform while simultaneously supporting receive communications using a narrowband (NB) ultra high frequency (UHF) satellite communication (SATCOM) waveform;
wherein the node includes a SATCOM antenna configured to transmit and receive the communications using the BLOS waveform and to receive the communications using the NB UHF SATCOM waveform, wherein the node includes a low noise amplifier (LNA) and triplexer assembly, wherein the first SDR and the second SDR share the SATCOM antenna and the LNA and triplexer assembly.

* * * * *